United States Patent [19]
Gold et al.

[11] 3,893,191
[45] July 1, 1975

[54] ELECTROMAGNETIC CLUTCH BRAKE ASSEMBLY

[75] Inventors: Joseph Gold, Springfield; Edward Kim-Eng, Newark; Paul Emile Plante, Mountainside, all of N.J.

[73] Assignee: Valcor Engineering Corporation, Kenilworth, N.J.

[22] Filed: Mar. 14, 1974

[21] Appl. No.: 451,304

[52] U.S. Cl. ................................. 310/76; 192/18 B
[51] Int. Cl.² ............................................ H02K 7/10
[58] Field of Search ............ 310/76, 94, 75, 93, 77, 310/95, 78, 108, 92, 110, 100, 96, 105, 79; 192/3.5 E, 12 D, 18 B, 1 A, 110; 318/362, 365–371

[56] References Cited
UNITED STATES PATENTS

| | | |
|---|---|---|
| 2,653,256 | 9/1953 | Walley ............................. 310/76 |
| 3,254,746 | 6/1966 | Myers ............................. 192/18 B |
| 3,254,746 | 6/1966 | Myers ............................. 192/18 B |
| 3,493,796 | 2/1970 | Siegel ............................. 310/76 |
| 3,504,773 | 4/1970 | Miller ............................. 192/18 B |
| 3,512,618 | 5/1970 | Schafer ........................... 192/18 B |
| 3,581,855 | 6/1971 | Taeffner .......................... 192/18 B |
| 3,587,797 | 6/1971 | Szekely ........................... 192/18 B |
| 3,642,104 | 2/1972 | Schafer ........................... 192/18 B |
| 3,687,252 | 7/1970 | Krull ............................. 192/18 B |

*Primary Examiner*—R. Skudy
*Attorney, Agent, or Firm*—Darby & Darby

[57] ABSTRACT

A rotary electromagnetic clutch brake assembly having opposed spring and magnetic forces such that on activation the clutch engages momentarily before the brake releases and on deactivation the brake engages before the clutch disengages so as to assure precise positive control of the rotary output of the assembly.

11 Claims, 4 Drawing Figures

ELECTROMAGNETIC CLUTCH BRAKE ASSEMBLY

BACKGROUND

This invention relates to rotary electromagnetic clutch brake assemblies and elements for such assemblies. More specifically it relates to the design of such assemblies and assembly elements for use in applications that require precise positive control of the rotary output of the assembly. This invention is particularly useful in photo and xerographic copying equipment for controlling the advance of the copy paper roll to feed and position the paper in the proper position in the copying machine.

There are a variety of types of electromagnetic clutches and electromagnetic brakes in the prior art. In the case of electromagnetic clutches they generally consist of an electric coil for generating a magnetic field which attracts mating clutch faces into engagement, thereby transmitting rotary power from the input clutch face to the output clutch face. Similarly, electromagnetic brakes operate by use of a magnetic field to attract the corresponding brake faces into engagement, one of the faces being fixed and the other being connected to the output. These devices can use magnetic force of repulsion as well as attraction, the essential action being that of displacing one of the clutch or brake faces relative to the other so as to produce the desired engagement or disengagement.

In addition to separate electromagnetic clutches and electromagnetic brakes, combined electromagnetic clutch brake assemblies are also known in the art. These assemblies use the same principles employed in the separate components.

SUMMARY OF THE INVENTION

The invention herein disclosed provides an improved electromagnetic clutch brake assembly wherein the clutch elements and brake elements are designed such that on activation of the clutch (i.e., driving position), the clutch faces engage momentarily before the brake faces release the output shaft. Thus, positive connection is assured between the input and output shafts before the brake on the output shaft is released. Similarly, on deactivation (i.e., braked position) the brake faces engage momentarily before the clutch faces disengage to stop the output shaft prior to disengagement of the clutch elements. In this way positive and precise control of the output shaft is achieved both on activation and deactivation.

The value of this arrangement is apparent in controlling a paper feed roll in a photo or xerographic copying machine. The leading edge of the feed paper is engaged and held in proper registration by the brake. The brake then releases, permitting the clutch to feed the paper into the proper position in the machine, i.e., the predetermined length matching the length of the original document to be copied. As soon as the paper reaches the exact position, the brake engages, thereby stopping the paper. There is no backlash, and the paper is always under positive control of the clutch.

The invention herein disclosed also improves on the current art in that it provides a clutch brake assembly that is extremely simple in construction and operation. A single electromagnetic coil is used for both the clutch and the brake. All parts are easily aligned with respect to each other. These features in turn make the assembly highly reliable and durable.

In addition the assembly herein disclosed is highly versatile and flexible in its ready adaptability to diverse operating requirements. Springs, coils, and armature elements can be easily changed to provide the precise torque characteristics (clutch and brake) required for the particular use in question.

In addition the assembly can be adapted for use as a clutch coupling, i.e., joining independent input and output shafts; or as a free running clutch mounted on a single shaft. The clutch coupling arrangement joins two "in-line" shafts, whereas the free running clutch couples the parallel shafts by means of suitable gearing.

Another feature of the invention is that it provides a fail safe operation. If electric power to the assembly fails, the brake automatically engages to stop the output shaft.

In addition, the assembly herein disclosed provides an improved clutch face and clutch face mounting means for producing the desired results. With respect to the clutch face, it is provided with grooves to improve its operation and prolong its life. With respect to its mounting, the clutch face is mounted on a spider spring which permits precise control of force required to engage and disengage the clutch face. In addition as will be described in detail below, this face (clutch armature) is mounted on the spider by pins punched into the clutch face, which pins are then swaged over the spider spring.

It is therefore an object of this invention to provide an improved means for positive and precise control in a clutch brake assembly for transmission of rotary power to an output.

It is another object of the present invention to provide an improved clutch assembly yielding more reliable, longer and more useful life than those presently known.

It is another object to provide an improved means for controlling the advance and positioning of feed paper into copier equipment.

These and other objects will become apparent from the following detailed description in which:

DRAWINGS

DETAILED DESCRIPTION

Figure 1:
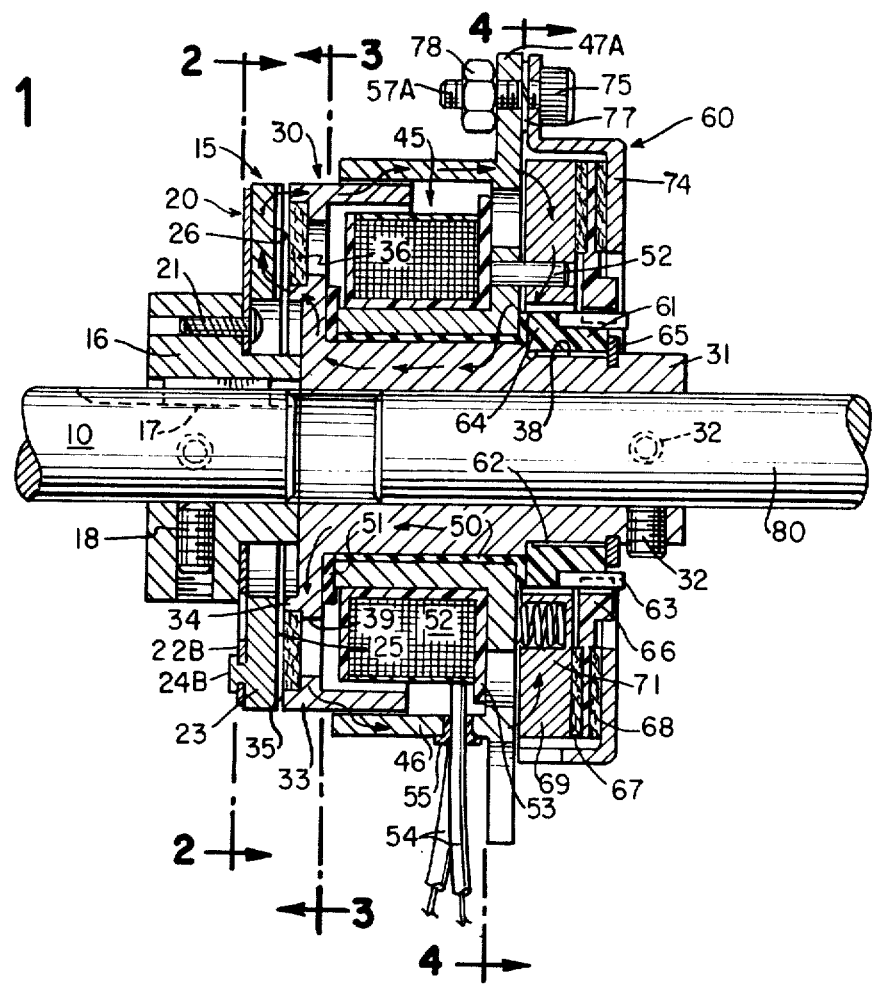
FIG. 1 is a cross sectional view of a preferred embodiment of the invention.

Referring now to FIG. 1, the subassemblies of the embodiment herein described are input shaft 10, clutch 15, rotor 30, shell and coil 45, brake 60 and output shaft 80. FIG. 1 illustrates the assembly in its deactivated condition, i.e., clutch disengaged and brake engaged. Briefly summarizing the operation, when the assembly is activated (by energizing coil 45), clutch 15 connects input shaft 10 to rotor 30 and brake 60 then releases output shaft 80, thereby permitting clutch 15 to transmit rotary power through rotor 30 to output shaft 80. Upon deactivation (deenergizing coil 45), brake 60 stops output shaft 80 and clutch 15 then disengages from rotor 30, returning to the position shown in FIG. 1.

Each of these subassemblies and their operation will now be described in detail.

Referring first to the clutch assembly 15 and referring to FIG. 1, clutch hub 16 is mounted on input shaft 10 by means of slotted key and keyway 17 and set screw 18. Hub 16 is thereby fixed so as to rotate with the input shaft 10.

Figure 2:
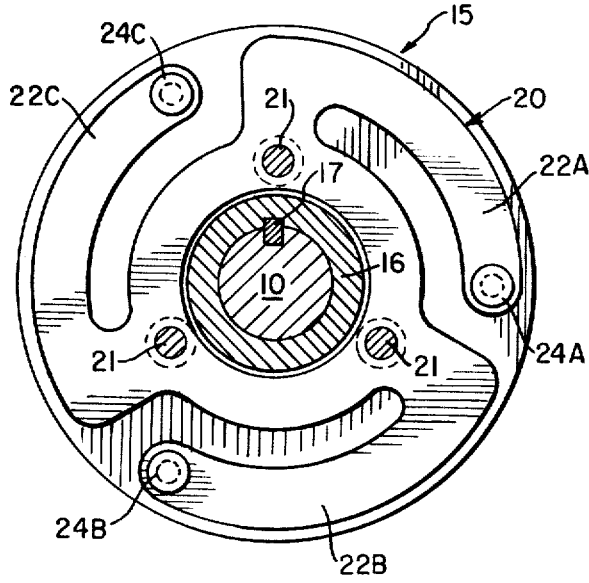
FIG. 2 is a sectional view of the embodiment shown in FIG. 1 taken on section lines 2—2 of FIG. 1.

Clutch spider 20 (Ref. FIGS. 1 and 2) is fixed on hub 16 by three screws 21 equally distributed on 120° arcs on hub 16. Spider 20 is shown in detail in FIG. 2 where it can be seen to comprise three arms 22A, B + C.

Spider arms 22A, B + C are connected to clutch armature 23 by means of three pins 24A, B + C, which extend through and are swaged over openings in corresponding arms 22A, B + C of spider 20. Thus armature 23 is fixed to rotate with hub 16 and input shaft 10; however, the spring action of spider 20 permits armature 23 to move axially a distance sufficient to engage the rotor 30 and thereby transmit rotary motion from the input shaft 10.

Figure 3:
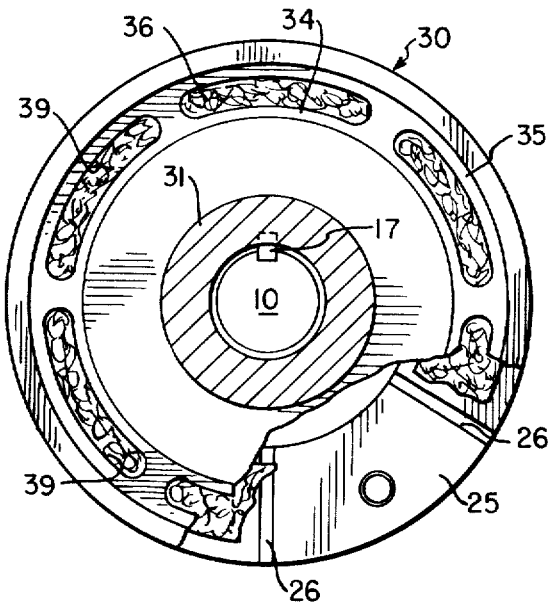
FIG. 3 is a sectional view of the embodiment shown in FIG. 1 taken on sectional lines 3—3 of FIG. 1.

The clutch face 25 of armature 23 is provided with equally distributed slots 26 (Ref. FIGS. 1 and 3), the function of which is to extend the useful life of the clutch by cleaning the opposed clutch engaging surface of the rotor 30 which will now be described.

Figure 4:
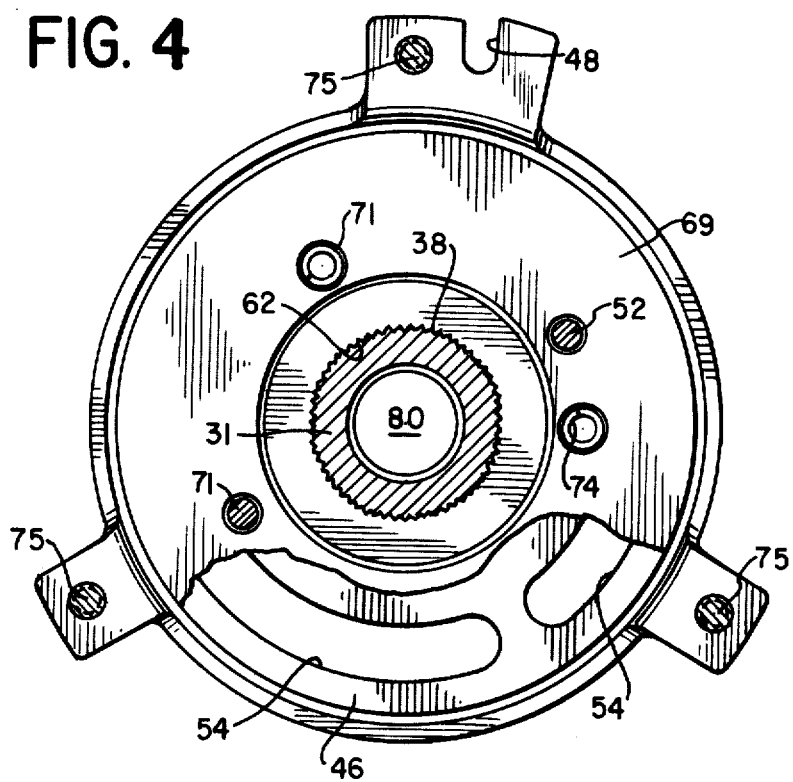
FIG. 4 is a sectional view of the embodiment shown in FIG. 1 taken on sectional lines 4—4 of FIG. 1.

Rotor 30 comprises rotor hub 31 which is fixed to output shaft 80 by means of set screws 32. Rotor hub 31 is provided at one end with clutch engaging face 33 having inner and outer annular extensions which serve as inner and outer pole rings 34 and 35 respectively. Disposed between pole rings 34 and 35 and flush with the engaging faces of such rings is friction ring 36 which is made of a conventional cork rubber composition that is glued to the rotor. Rotor hub 31 is provided at the opposite end with an external spline 38 (Ref. FIGS. 1 and 4), the function of which will be described below.

The shell and coil subassembly 45 comprises shell 46 having bracket 47A with "U" slot 48 which upon interposition of a pin or obstruction in the clutch mounting prevents the shell 46 from rotation. Thus shell 46 remains stationary in use. Rotor hub 31 rotates freely inside shell 46, being rotatably mounted within shell 46 by low friction bushing 50 fitted on rotor 31. Rotor 31 is prevented from axial movement within shell 46 at one end by the flanged portion of bushing 50 and at the opposite end by thrust bearing 51. Bushing 50 may be held stationary in the bore of shell 46 by means of a raised rib that fits in a slotted keyway inside the bore of shell 46 (not shown).

Shell 46 serves to house coil 52 by means of coil bobbin 53 which is press fit and glued to shell 46. Electrical leads 54 enter the interior of shell 46 to furnish electric power to coil 52 and are protected against damage by the shell by bushings 55.

Shell 46 is provided in addition to bracket 47A with brackets 47B + C, all three of which have drilled and tapped openings 57A, B + C (Ref. FIG. 4), the purpose of which is described below. Shell 47 is also provided with dowels 52 and 53 positioned adjacent brake 60 and cooperating therewith in a manner hereinafter described.

Referring now to brake 60, this subassembly comprises brake hub 61 having an internal spline 62 which is press fit on rotor spline 38, and external spline 63 with shoulder 64. Hub 61 is axially positioned on rotor spline 38 by retaining ring 65 which presses hub 61 against the flange portion of bushing 50 on rotor 31.

Brake plate 66 is internally splined and mounted so as to be axially movable on external spline 63 of brake hub 61 (Ref. FIG. 4). Thus, plate 66 is movable in an axial direction relative to hub 61 a distance sufficient to engage and disengage brake 60 as now described. Brake plate 66 is provided at its outer periphery with friction rings 67 and 68 made of a rubber or cork composition which is glued to plate 66. Brake armature 69 is movably mounted in an axial direction on dowels 52 and 53 extending from shell 46. Three springs 71, which are housed in three equally distributed (120°) corresponding cavities drilled into brake armature plate 69, bias plate 69 against friction ring 67. This bias in turn forces brake plate 66 and friction ring 68 against pressure cup 74 which is held stationary by the three mounting screws 75 threaded into openings 57A, B + C of brackets 47A, B + C extending from shell 46.

Thus, springs 71 urge friction ring 68 against stationary pressure cup 74 (through armature plate 69, friction ring 67, and brake plate 66) to prevent rotation of output shaft 80, when the clutch brake assembly is in its deactivated (disengaged clutch/engaged brake) condition as shown in FIG. 1.

The spacing between pressure cup 74 and shell 46 and thereby the effective spacing between the braked and unbraked position of brake plate 66, is controlled by cap screws 75. Split lock washers 77 are provided between pressure cup 74 and brackets 47 which serve to space pressure cup 74 from the brackets 47 dependent on the depth to which cap screws 75 are threaded into the extensions. Once the desired spacing is obtained, it is maintained by hex head lock nuts 78.

Having described the elements of a preferred embodiment of the invention, its operation will now be described. As indicated above, the assembly as shown in FIG. 1 is in the deactivated condition, i.e., clutch-disengaged/brake-engaged position. In this position output shaft 80 is held firmly against rotary action by the frictional force of friction ring 68 against pressure cup 74. Cup 74 is held against rotation by the U-slot 48 which radially fixes the entire assembly against rotation. Input shaft 10 is free to rotate (no rotary power being transmitted) since the clutch face 25 of clutch armature 23 is not engaged to pole rings 34 and 35 and friction ring 36 of rotor 31.

When a rotary output is desired, the coil is energized thus creating a magnetic field following the path shown in the dashed arrows in FIG. 1, i.e., through rotor hub 31, pole ring 34, clutch armature 23, pole ring 35, shell 46, and brake armature 69. The path of this field is directed through pole rings 34 and 35 by inclusion of arcuate slots 39 (Ref. FIG. 3) in the pole face of rotor 30. Similarly the magnetic field is directed to and through brake armature 69 by arcuate slots 54 (Ref. FIG. 4) in the brake face of shell 46.

Initially this magnetic field is strong enough to pull clutch armature 31 against the relatively soft biasing force of spider 20 into contact with the rotor pole rings 34 and 35 and friction ring 36. Input shaft 10 is now electromechanically coupled to output shaft 80 through rotor 30. Brake armature 69 is delayed in being attracted to shell 46 since springs 71 are relatively stiff and the magnetic field necessary to provide sufficient pull-in against shell 46 becomes possible only after clutch armature 31 pull-in. Pull-in of brake armature 69 releases friction ring 68 from pressure cup 74, thereby releasing output shaft 80.

De-energization, conversely, causes brake armature 69, due to stiff springs 71 to return to its braking position, i.e., forcing the friction ring 68 against pressure cup 74, thereby stopping output shaft 80. Instantaneously after this action clutch armature 23 is released, thereby disconnecting drive shaft 10 from rotor 30.

This sequence of activation and deactivation is particularly advantageous in load pick-up and position in equipment such as equipment controlling the advance of the feed roll in a copier machine. The leading edge of the paper is engaged prior to brake release, thereby prohibiting a condition where the clutch-armature is disengaged from the load when the brake is disengaged. Likewise on deactivation the brake engages before the clutch engages, thereby maintaining zero backlash, positive control of the paper during all phases of operation.

It will be apparent to those skilled in the art that to obtain and maintain this sequence of operation, it is essential that the relative forces of spider 20 and springs 71 and relative reluctances of clutch armature 28, and brake armature 69, be predetermined so as to provide the properly timed movements. In view of this, the value of a spider-type spring biasing force for the clutch armature becomes apparent. This configuration provides a diaphragm type action whereby minimal spring forces need be overcome to obtain limited but sufficient axial movement. The spider also lends itself to this operation since the materials, dimensions and shape of the arms of the spider can be varied to provide the precise biasing force required for optimum operation under a variety of conditions. Similarly, it will be apparent to those skilled in the art that the brake springs can likewise be varied in spring material, dimensions and configuration to obtain the desired performance.

With respect to the materials of construction suitable for this assembly, it is apparent that those parts through which the magnetic field travels must be made of a suitable magnetic material. Applicants have found that cold rolled steel is quite adequate for this purpose. In addition, the exterior surfaces of these elements may be advantageously cadmium plated for corrosion resistance. With respect to the friction rings in the clutch and brake portions of the assembly, applicants have found that a variety of cork and rubber compositions are satisfactory. These compositions can be glued directly to the corresponding elements with a variety of epoxy cements.

The brake plate and associated spline may be made of a molded polycarbonate resin material. Likewise the rotor shell bushing may be made of a low friction thermoplastic resin material.

As stated earlier, the above detailed description relates to one of the preferred embodiments of this invention. It will be apparent to those skilled in the art that many variations are possible. For example, the input to the clutch as described above is an input shaft. Instead it could be a spur gear input rotating freely on a bearing on a fixed mounting shaft. Thus, the input would be through the teeth of the spur gear attached to the clutch hub rather than through a drive shaft to the hub as illustrated and described in detail in this application. Similarly, the output in the embodiment described above is shown as an output shaft, but could as easily be indicated as an output gear keyed into the output shaft.

Thus this assembly can be adapted to coupling independent in-line shafts as well as coupling parallel shafts. Likewise it can be adapted to suit a range of torque requirements dependent on the coils selected and associated armature and spring operating mechanisms.

Accordingly, although a single preferred embodiment has been described above in detail, it is to be understood that other embodiments and other variations to this embodiment are available and yet fall within the scope of this invention. Accordingly, we do not intend to be limited to the specifically described embodiment but rather to a fair construction of the following claims.

What is claimed is:

1. Electromagnetic clutch brake assembly comprising:
   a. clutch armature having a frictional engaging face which is movable between an engaged power-transmitting position and a disengaged no-power position,
   b. clutch biasing means contacting said clutch armature for biasing said clutch face to its disengaged position,
   c. rotor positioned adjacent said armature and having a frictional engaging face positioned to be engaged and driven by said clutch armature face when said clutch face is in its engaged position,
   d. said clutch biasing means comprising spider means having a plurality of spring arms, means connecting said arms to said armature, and means positioning said spider a predetermined distance from said rotor,
   e. brake armature positioned adjacent to said rotor and having a frictional engaging face movable between an engaged braking position and a disengaged free position,
   f. brake biasing means contacting said brake armature for biasing said brake face to its engaged braking position,
   g. brake stop means positioned adjacent said brake face and having a fixed frictional engaging face positioned to engage and stop said brake face when said brake face is in its engaged position,
   h. electromagnetic coil associated with said rotor for magnetically displacing said clutch face against the opposing force of said clutch biasing means toward and in engagement with said rotor means and magnetically displacing said brake face against the opposing force of said brake biasing means away from and out of engagement with said stop means in response to the activation of said coil,
   i. said clutch and brake biasing means having biasing forces relative to each other and to the magnetic forces required to engage and disengage said clutch and brake faces such that clutch means engages before said brake means disengages on activation of said coil, and said brake means engages before said clutch means disengages on deactivation of said coil.

2. An electromagnetic clutch brake assembly as claimed in claim 1 wherein the relative stiffness of the springs for said clutch and brake biasing means is such that on activation of the assembly the clutch biasing means yields to the magnetic force tending to engage the clutch armature to the rotor, and the spring force acting on the brake biasing means prevents said brake armature from disengaging from said brake stop means until the clutch armature engages the rotor, thereby increasing the magnetic force acting on the brake armature an amount sufficient to overcome the force of said brake biasing means so as to disengage said brake armature from the brake stop means.

3. In a rotary electromagnetic clutch brake assembly having a clutch armature with a frictional engaging face rotatably mounted about on a central axis, a rotor on said axis with a corresponding clutch engaging face, a brake armature also rotatably mounted on said axis with a brake face, and a brake stop means with a corresponding brake face, and a coil for engaging said clutch face to said rotor face and for disengaging said brake face from said stop means upon activation of said coil, the improvement comprising a first biasing means fixed laterally with respect to said axis for urging said clutch face away from engagement with said rotor, and a second biasing means for urging said brake face into engagement with said brake stop means, the relative biasing forces of said first and second biasing means being predetermined such that said first biasing means releases the clutch face to engage the rotor before the second biasing means release the brake face from the brake stop means, said first biasing means comprising a spider means mounted on said axis having a central position fixed laterally relative to said axis, laterally displaceable spring arms radiating therefrom, and means connecting said arms to the clutch armature.

4. The improvement as claimed in claim 3 further comprising a plurality of radially extending slots in the clutch armature face.

5. An electromagnetic clutch brake assembly for transmitting and braking power from a rotary input to a rotary output comprising:
   a. rotary clutch means comprising an armature driven on a given axis by said rotary input, said armature having a frictional clutch face, and spider means connecting said armature and clutch face to said rotary input, said armature and clutch face being mounted on said spider means so as to be laterally displaceable between an engaged power transmitting and disengaged idling position, said spider means biasing such face toward its disengaged position;
   b. rotor means mounted coaxial and adjacent to said clutch armature, said rotor means having at one end magnetic pole rings positioned so as to be contacted and driven by said clutch face when such face is in its engaged position;
   c. brake means mounted adjacent said rotor means comprising a brake armature and brake frictional face, means for mounting said brake armature and face adjacent each other and coaxial with and laterally displaceable relative to said rotor between an engaged braking position and a disengaged free position, said brake armature and face mounting means comprising a spline laterally displaceably connecting said face to said rotor means, for rotating said face with said rotor, biasing means for urging said brake face to its engaged braked position, brake stop means comprising a fixed frictional face positioned to be contacted by and to stop said brake face when said brake face is in its engaged position,
   d. circular shell fixedly mounted coaxially with said rotor, said shell including an electromagnetic coil for generating a magnetic field through said rotor pole rings, clutch armature, shell, and brake armature for magnetically displacing the clutch face to engage the rotor pole rings and for magnetically displacing said brake armature and brake face from said stop means in response to the activation of said coil, reversing this when said coil is deactivated,
   e. said clutch spider and brake biasing means having stiffnesses relative to each other and relative to the magnetic forces required to displace said clutch and brake faces such that said clutch face engages before said brake face disengages on activation of said coil, and said brake face engages before said clutch face disengages on deactivation of said coil.

6. An assembly as claimed in claim 5 wherein said mounting means further comprises dowel means laterally displaceably mounting said brake armature to said rotor means.

7. An assembly as claimed in claim 6 wherein said brake biasing means comprise a plurality spring coaxially positioned for urging said brake armature and face toward said brake stop means.

8. An assembly as claimed in claim 7 further comprising means for adjusting the position of the brake stop means to compensate for wear of the brake face.

9. An assembly as claimed in claim 5 wherein said rotor means further comprises arcuate slots between said pole rings.

10. An assembly as claimed in claim 5 wherein said shell further comprises arcuate slots adjacent said brake armature for directing the magnetic field to and through said brake armature.

11. An assembly as claimed in claim 5 wherein said clutch face further comprises a plurality of radially extending slots.

* * * * *